May 19, 1925.  1,538,132
B. J. MINNIER
PISTON
Filed Jan. 16, 1925
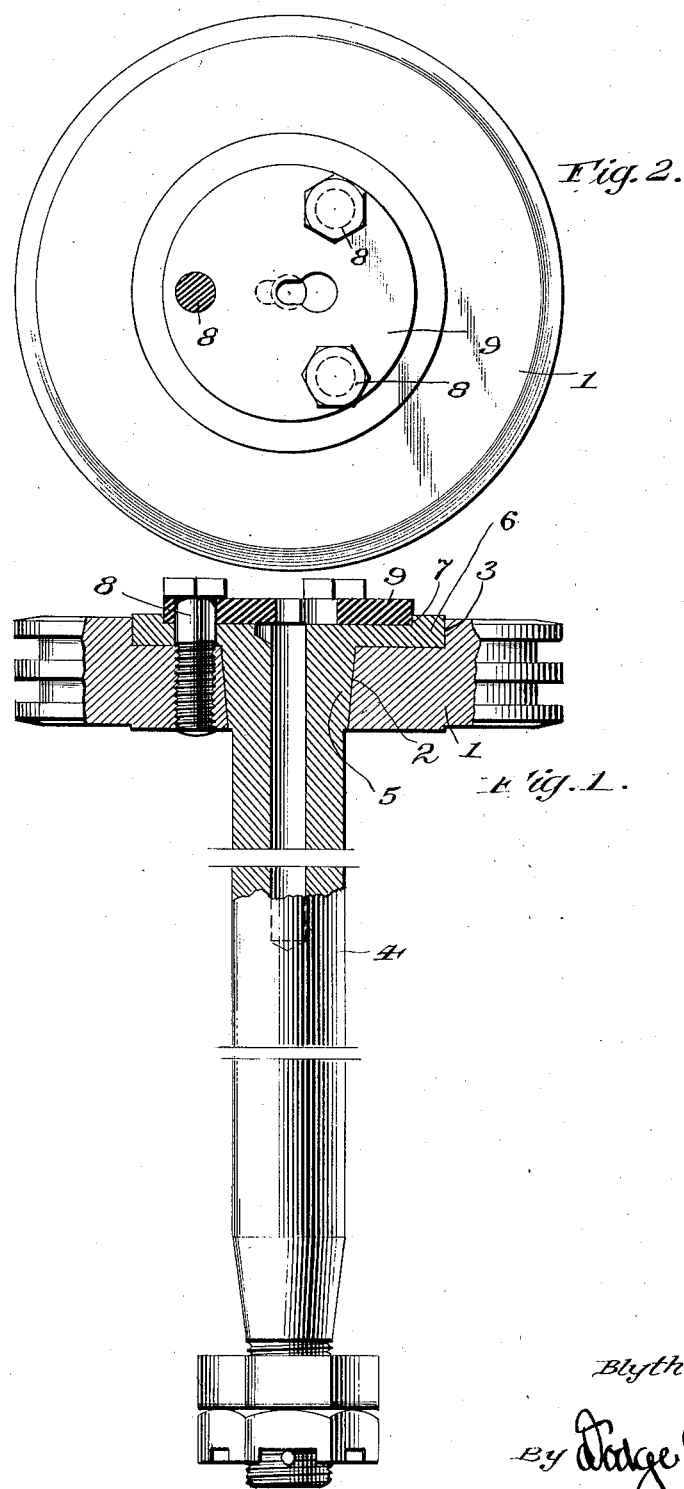
Inventor:
Blythe J. Minnier,
By Dodge and Sons,
Attorneys.

Patented May 19, 1925.

1,538,132

UNITED STATES PATENT OFFICE.

BLYTHE J. MINNIER, OF WATERTOWN, NEW YORK, ASSIGNOR TO THE NEW YORK AIR BRAKE COMPANY, A CORPORATION OF NEW JERSEY.

PISTON.

Application filed January 16, 1925. Serial No. 2,823.

*To all whom it may concern:*

Be it known that I, BLYTHE J. MINNIER, a citizen of the United States, residing at Watertown, in the county of Jefferson and State of New York, have invented certain new and useful Improvements in Pistons, of which the following is a specification.

This invention pertains to pistons for steam engines, and relates more particularly to the means employed for connecting the piston head and rod.

Heretofore various structures have been designed to produce an efficient connection between the head and rod and some of these have been more or less effective. I have found, however, that due to the very close clearances at the end of the stroke the parts are apt to bottom, and due to the constant pounding which, as a consequence, inheres, the connection between the piston head and rod become loose.

The main object of the invention is therefore to produce a connection between the head and rod which, notwithstanding the parts may bottom, will not become loose. What is more, the present construction is simple and the parts are easily assembled.

The invention is illustrated in the annexed drawings, wherein:

Fig. 1 is a sectional elevation of the rod and piston head, and

Fig. 2 an end or face view of the piston and its allied parts.

In the drawings, 1 denotes the piston head formed with an axial tapering bore or recess 2 extending therethrough. The head, at what may be termed its outer face, is formed with an annular countersunk recess 3 into which the upper larger end of bore 2 extends. The piston rod is designated by 4 and is formed with a conical neck 5 and a laterally extending or mushroom-shaped head 6 of such a diameter as to make a neat fit within the recess 3.

The head, similar to the piston head, is provided in its outer face with a circular recess 7 for a purpose which will presently appear. The diameter of the rod 4 is such that it may be freely passed through the tapered opening 2 in the piston head when the parts are assembled, at which time the tapered neck seats closely in the tapered seat and simultaneously the laterally extending head 6 of the rod finds its seat within the recess 3.

To secure the rod firmly to its seat within the piston head a plurality of machine bolts 8 are employed. Said bolts are screwed into the piston head passing through openings formed in the flange or head 6 and through aligned openings formed in a plate or disk-like member 9 seated within the recess 7 formed in said head 6. Plate 9 is provided with the usual key-hole slot for the reception of the usual valve stem (not shown).

With the machine screws turned home the piston head and rod are firmly secured together and, as will be seen upon an inspection of the drawing, the parts have an extended bearing, this by reason of the tapered seat and the laterally extending head 6 seated within the recess formed in the piston head 1.

In operation, if there be any bottoming of the parts, the contact will take place upon the lateral extension or head 6 of the rod, and as a consequence there is no tendency owing to such bottoming to separate the rod and the piston head. On the contrary, any bottoming action will tend to force the rod more firmly to its seat within the piston head, this owing to the construction above set forth.

Where the rod is threaded into the piston head, as is common practice, the constant pounding upon the parts soon loosens up the piston from the rod. Commercial use of the present structure has demonstrated that no looseness obtains even though the pounding action inheres.

What is claimed is:

1. In combination, a piston head having an axially disposed tapered opening extending therethrough, and likewise having a recess formed in that face adjacent the larger portion of said tapered opening; a piston rod having a tapered neck fitting within said tapered opening, and a laterally extending head seated within the recess; and means for securing the said heads together.

2. In combination, a piston head having an axially disposed tapered opening extending therethrough, and likewise having a recess formed in that face adjacent the larger portion of said tapered opening; a piston rod having a tapered neck fitting within said tapered opening, and a laterally extending head seated within the recess; a plate seated within a recess formed in the outer face of the piston rod head; and a plurality of machine screws extending through the plate and piston rod head and into the body of the piston head.

3. In combination, a piston head having an axially disposed tapered opening extending therethrough, and likewise having a recess formed in that face adjacent the larger portion of said tapered opening; a piston rod having a tapered neck fitting within said tapered opening, and a laterally extending head seated within the recess, said head extending above the contiguous surface of the piston head; a plate seated within a recess formed in the outer face of the piston rod head, said plate extending outwardly beyond the contiguous face of the rod head; and a plurality of machine screws extending through the plate and piston rod head and into the body of the piston head.

In testimony whereof I have signed my name to this specification.

BLYTHE J. MINNIER.